US007942601B2

(12) United States Patent
Bohman et al.

(10) Patent No.: US 7,942,601 B2
(45) Date of Patent: May 17, 2011

(54) FULLY AUTOMATIC TWISTLOCK TO BE CONNECTED TO A CONTAINER AND A METHOD FOR RELEASING A FIRST CONTAINER FROM A SECOND

(75) Inventors: Hans Bohman, Stockholm (SE); Lars Nyberg, Bromma (SE); Markus Nyman, Stockholm (SE)

(73) Assignee: Cargotec Finland Oy, Tampere (FI)

( * ) Notice: Subject to any disclaimer, the term of this patent is extended or adjusted under 35 U.S.C. 154(b) by 342 days.

(21) Appl. No.: 11/922,351

(22) PCT Filed: Jun. 21, 2005

(86) PCT No.: PCT/SE2005/000962
§ 371 (c)(1),
(2), (4) Date: Apr. 18, 2008

(87) PCT Pub. No.: WO2006/137759
PCT Pub. Date: Dec. 28, 2006

(65) Prior Publication Data
US 2009/0116901 A1    May 7, 2009

(51) Int. Cl.
*B60P 7/08* (2006.01)
(52) U.S. Cl. .............. 403/343; 410/82; 220/1.5; 24/287; 403/330
(58) Field of Classification Search .................. 403/323, 403/330, 350, 343, 409.1; 248/500, 503; 220/1.5; 410/82, 83; 24/287
See application file for complete search history.

(56) References Cited

U.S. PATENT DOCUMENTS

| 3,368,838 | A | * | 2/1968 | Reich | 294/82.24 |
| 3,768,857 | A | * | 10/1973 | Horton | 410/83 |
| 4,626,155 | A | * | 12/1986 | Hlinsky et al. | 410/82 |
| 5,183,375 | A | * | 2/1993 | Fenton et al. | 410/35 |
| 5,632,586 | A | * | 5/1997 | Nyholm | 411/552 |
| D385,775 | S | * | 11/1997 | Reynard | D8/354 |
| 5,758,391 | A | * | 6/1998 | Donner et al. | 24/287 |
| 5,765,977 | A | * | 6/1998 | Reynard | 410/82 |
| 6,519,816 | B1 | * | 2/2003 | Tagaguchi et al. | 24/287 |
| 7,621,414 | B2 | * | 11/2009 | Bederke | 220/1.5 |
| 2007/0212183 | A1 | * | 9/2007 | Brewster | 410/82 |

FOREIGN PATENT DOCUMENTS

JP  2006-76636  3/2006
WO  WO 2004/020316 A1  3/2004

* cited by examiner

Primary Examiner — Joshua T Kennedy
(74) Attorney, Agent, or Firm — Harness, Dickey & Pierce, P.L.C.

(57) ABSTRACT

The present invention relates to a coupling device (1) to be connected to a corner fitting of a container, the coupling device comprises a housing (2), an engaging part (3) which is at least partially insertable into and releasable from said corner fitting. The engaging part (3) has a guide part (4) for guiding the engaging part with said corner fitting, further the engaging part (3) is rotably mounted in said housing (2) by means of a shaft portion (5) extending into the housing. The guide part (4) has a translation guide path for guiding the engaging part (3) in relation to the corner fitting in a horizontal direction, which translation guide path is rotational asymmetric in relation to an axis (7) of the shaft portion (5). Also included is a method for releasing a first container from a second.

9 Claims, 13 Drawing Sheets

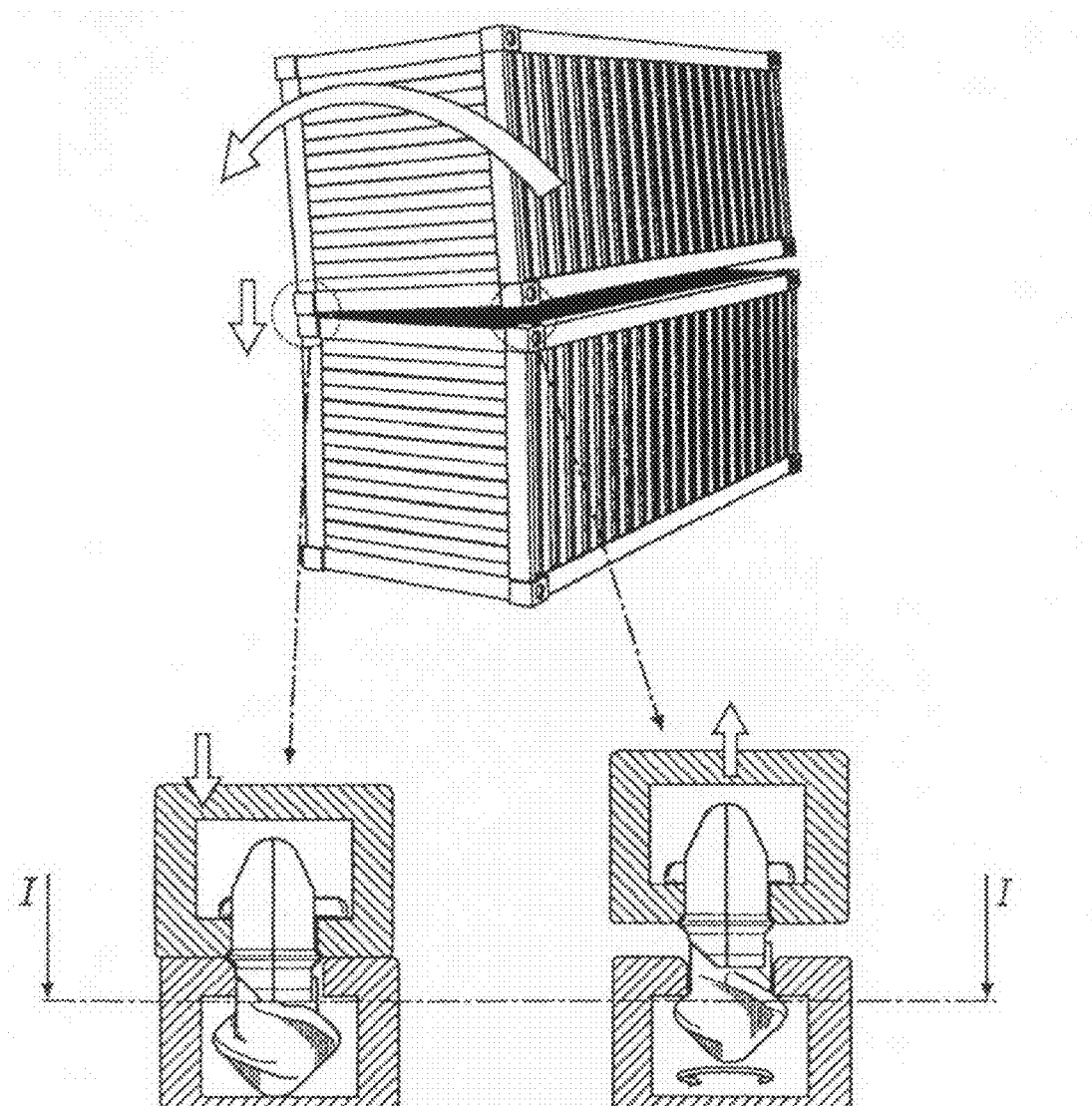
FIG. 4(c)(1)   FIG. 4(c)(2)
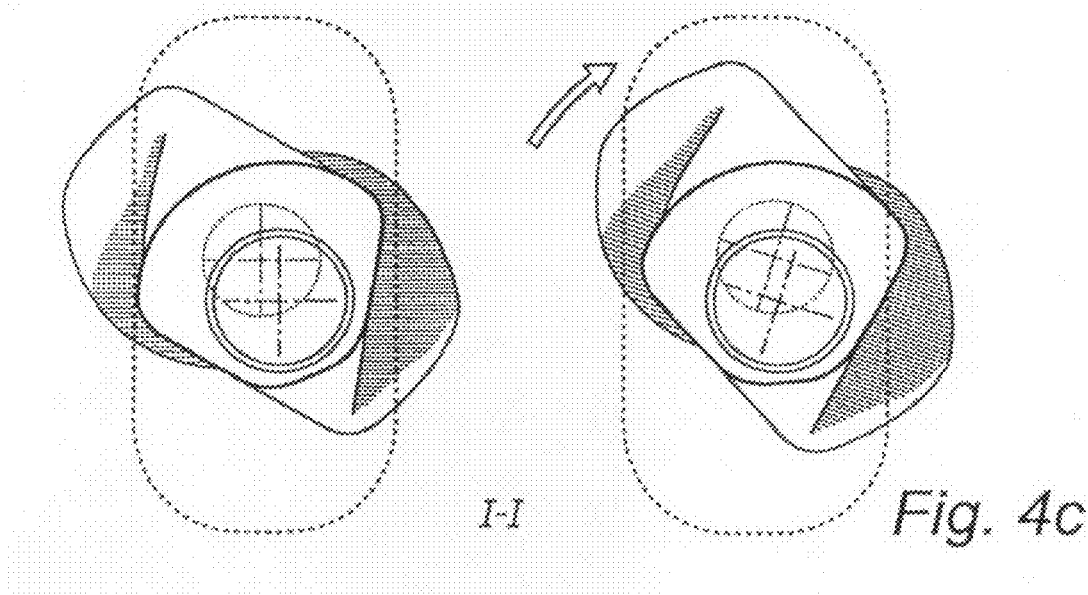
I-I   Fig. 4c

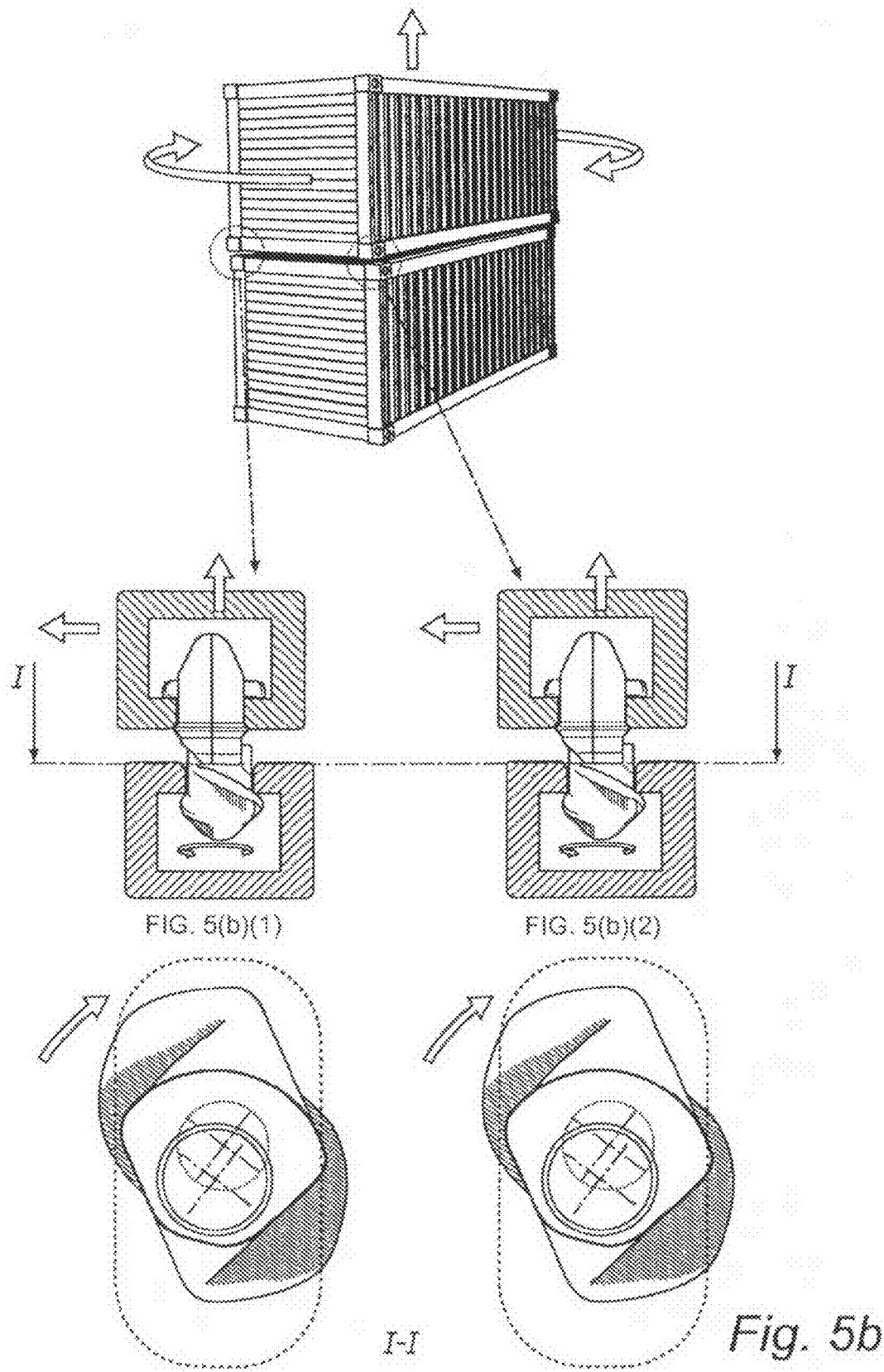

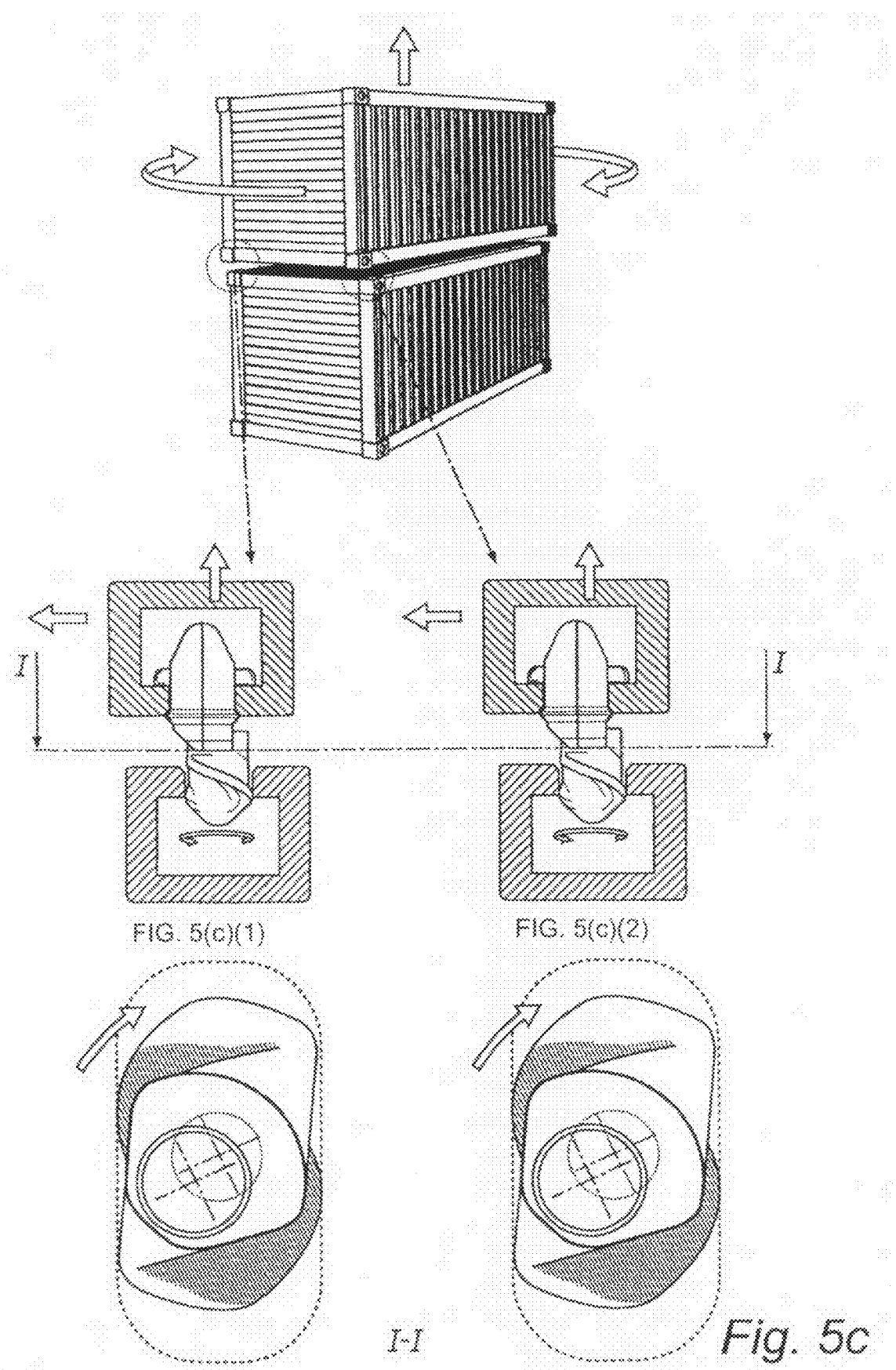
FIG. 5(c)(1)   FIG. 5(c)(2)
I-I   Fig. 5c

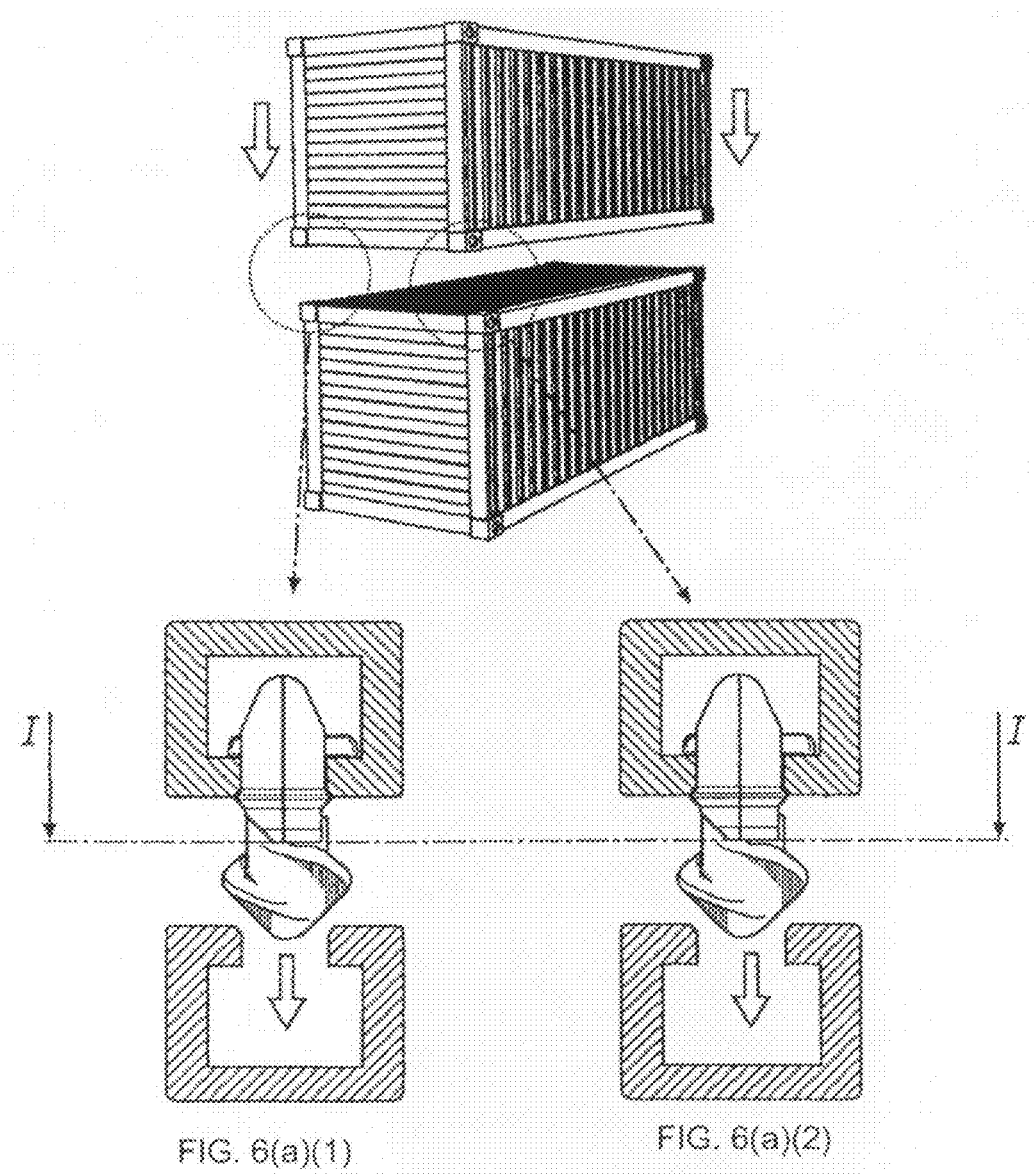
FIG. 6(a)(1)  FIG. 6(a)(2)
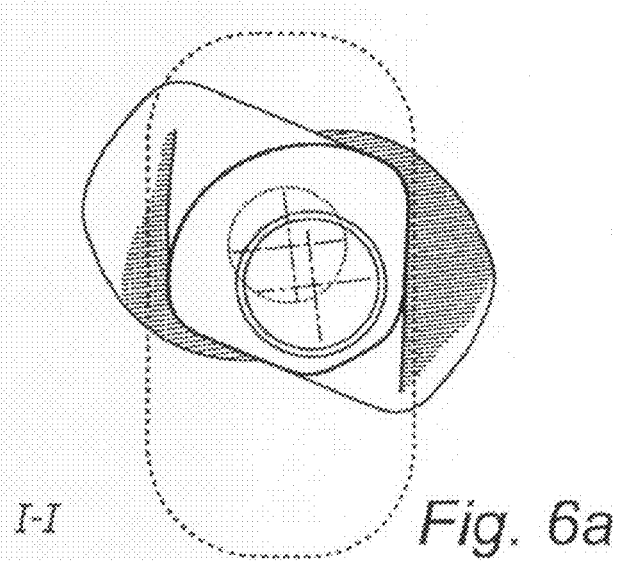
I-I  Fig. 6a

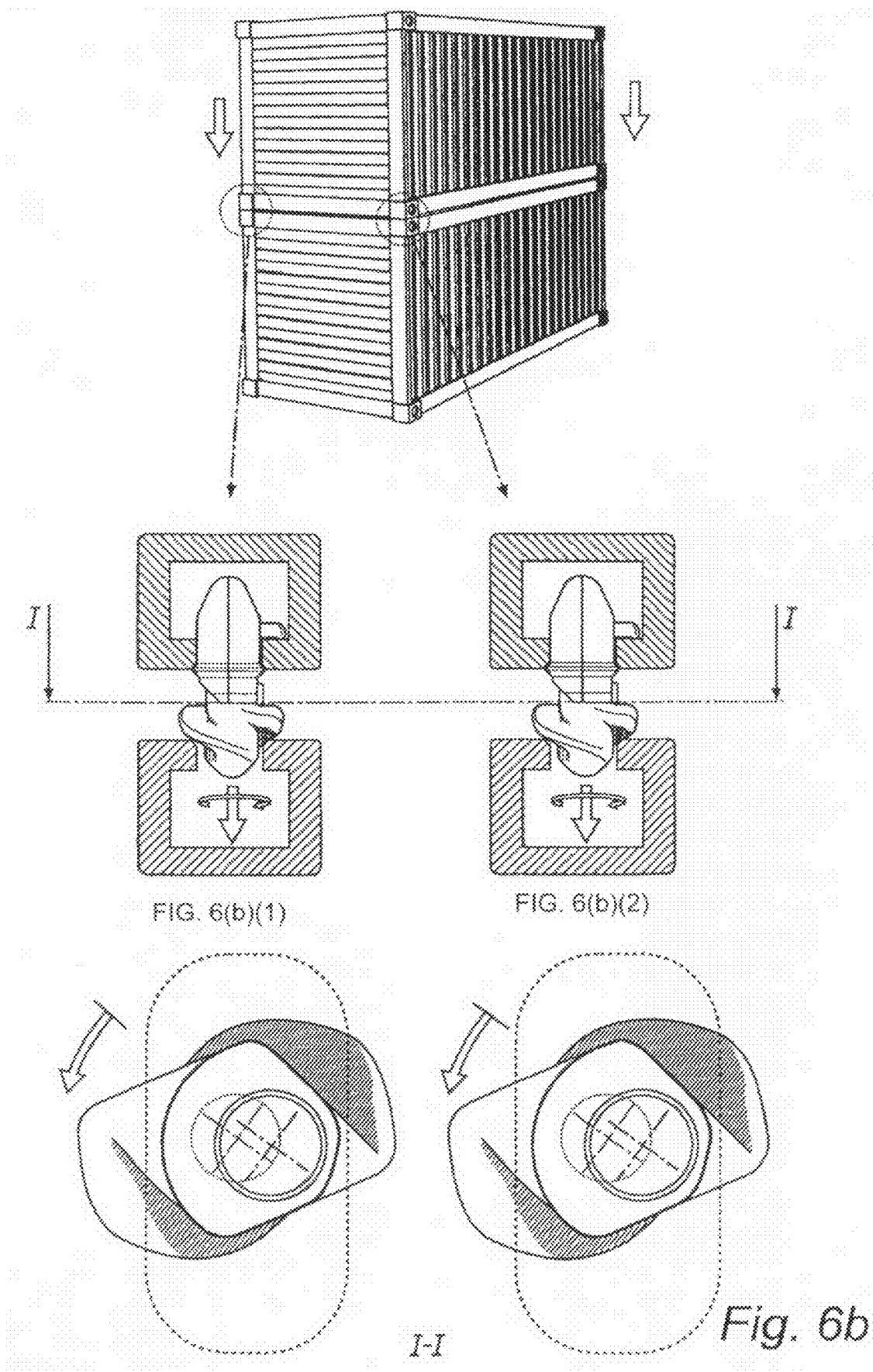

FULLY AUTOMATIC TWISTLOCK TO BE CONNECTED TO A CONTAINER AND A METHOD FOR RELEASING A FIRST CONTAINER FROM A SECOND

TECHNICAL FIELD

The present invention relates to a coupling device to be connected to a corner fitting of a container and a method for connecting and releasing a coupling device, to be connected to a corner fitting of a container. The coupling device comprises a housing, an engaging part which is at least partially insertable into and releasable from the corner fitting. The engaging part has a guide part for guiding the engaging part with the corner fitting.

BACKGROUND ART

When transporting goods, for instance, on cargo ships, trains and trucks, part-load, freight and thermo-containers are used to a great extent. Such containers are easy to handle in loading and unloading due to standardized sizes and a robust construction that allows stacking of a plurality of containers on top of each other. Containers are stacked both during storage and transportation of containers. This design of containers, which are often referred to as ISO containers, allows the transported goods to be well protected in transport and also during loading and unloading.

Containers of the type described above are usually rectangular with floor, roof, two side walls and two end walls. One end wall usually consists of a door portion which is often formed as a pair of doors. Corner fittings with oval holes are usually arranged at the corners of the container and allow connecting and lashing of containers.

To connect and lash two or more containers, use is made of equipment comprising a lockable coupling which can be inserted into and locked to a corner fitting of an ISO container. WO2004/020316 discloses a hook shaped coupling for connecting two containers to each other, the containers are connected to each other by lowering the upper container and at the same time rotating it around a central vertical axis for achieving a simultaneous movement at all four corners of the container corresponding with the geometry of the hook shaped coupling. The upper container is released by lifting and at the same time rotating the upper container around a central vertical axis. In this way all four hooks are released at the same time and with a movement reversed in relation to the movement for connecting of the two containers.

Transport systems of today, for example ships, can take several thousands of containers, the containers are stacked on top of each other in order to efficient use the available space. For this method of loading to be safe in transport, each container is connected to at least one neighbouring container, or to the transport vehicle, by means of, for example, lockable couplings. Consequently, the stacked containers are locked to each other and to the transport vehicle, thereby providing a stable connected three-dimensional transport stack.

It is currently usual that thousands of containers are used at one ship. This means that small reductions of the time used during handling of each container may yield considerable saving of time and hence economic profit in the end.

It is desirable with fast and efficient loading and unloading of containers, it is also desirable to minimize the need of personnel during loading and unloading of containers. There is today container couplings which does not need to be manually operated after/during connection or disconnection of two containers. But there is problems with this kind of container couplings, if for example the loaded/unloaded ship is tilting during loading/unloading it will problems to connect the containers since the couplings at all four corners of the container has to engage simultaneously. The same problem will occur if the movements of the crane are not exact enough.

The above described container couplings, according to prior art, does only transfer forces between connected containers on one side of the hole of the corner fitting, for example during displacement of the containers at sea (due to waves, wind etc.).

It is thus desirable to provide a coupling which that is fast and efficient to handle during loading and unloading.

SUMMARY OF THE INVENTION

Example embodiments provide a quick and easy handling of a coupling device for fastening containers.

The above object and other objects that will be evident from the following description are achieved by a coupling device to be connected to a corner fitting of a container according to the appended claims.

According to one aspect of the invention, a coupling device, to be connected to a corner fitting of a container, comprises a housing, an engaging part which is at least partially insertable into and releasable from said corner fitting, said engaging part has a guide part for guiding the engaging part with said corner fitting, wherein said engaging part being rotably mounted in said housing by means of a shaft portion extending into the housing, said guide part having a translation guide path for guiding the engaging part in relation to said corner fitting in a horizontal direction, which translation guide path is rotational asymmetric in relation to an axis of said shaft portion.

One function of the translation guide path is to provide a horizontal guided movement for the coupling during release of the coupling from the corner fitting. This may be achieved by an asymmetric or eccentric translation guide path.

Advantages of the inventive concept is that a fully automatic coupling can be provided, which is automatic both during lashing and disengaging of a container. With a coupling according to the invention there are less demand on precision and tolerances of the movements, eventually tilted position of the containers during coupling and handling.

A further advantage of the invention is that the engaging part is provided to transmit lashing loads on both sides of the oblong hole in the corner fitting, which is not the case with couplings according to prior art causing strength problems.

Preferably said guide part of the coupling device has a rotational guide path for rotation of the engaging part. The rotational guide path drives the rotation of the engaging part, which rotation is utilized to achieve the automatic release and lashing of the coupling.

There are different possible combinations of mechanical components to materialize the translation and rotation guide paths. For example it is possible to use the cam and screw described in the detailed description, below, in different combinations.

Firstly it is possible to use a combination of the surfaces of the cam and screw as translation guide path and the surfaces of the screw flange as rotational guide path. This is the case described in the present embodiment of the invention.

In a second alternative, the cam surface alone could be provided as translation guide path and the surfaces of the screw flange works as rotation guide path, which in this case, does not necessary need to be eccentric or asymmetric since it does not work.

In a third alternative it is possible to provide the surfaces of the screw both as translation and rotation guide paths, this would cause a different geometry of the engaging part and guide part.

In a preferred embodiment, said rotational guide path has a pitch for driving the engaging part in relation to said corner fitting in a vertical axial direction, parallel with the axis of said shaft, during rotation. The pitch can be provided as a screw flange or a part of a screw flange, it is also possible to utilize other geometrical shapes to achieve the same effect as with the pitch of a screw.

Furthermore, the rotational guide path has a first guide surface, for rotation of the engaging part during connection with the corner fitting, and a second guide surface for rotation of the engaging part during release from the corner fitting. Example embodiments relate to using the second guide surface in combination with an asymmetric or eccentric geometry to achieve the properties which makes the coupling automatic during release.

Moreover, it is preferred that the guide part may have the shape of a screw or a geometry similar to a screw. It can for example be provided with a short screw flange i.e., during only a part of the periphery of the core. Preferably, the thread of the screw may be provided with lower and upper flanks constituting the first and second guide surfaces.

In a preferred embodiment the engaging part is rotatable against spring action from a neutral position in one direction during connection with said corner fitting and rotatable against spring action in the opposite direction from the neutral position during release from said corner fitting. Consequently the coupling, and engaging part, has different characteristics during rotation clockwise and counter clockwise respectively from the neutral position. The spring endeavor to return the engaging part to the neutral position.

Preferably said engaging part has a cam provided with the translation guide path, which in cooperation with the rotational guide path interacts with said corner fitting forcing the housing to move with a horizontal component during release of said engaging part from the corner fitting. Advantageously said cam is fixedly positioned on the engaging part between said shaft and said guide part.

In a preferred embodiment the guide part of the coupling device has a conical outer shape. The conical shape helps the engaging part of the coupling to enter the hole of the corner fitting during connection of a container.

Moreover it is preferred that the engaging part is provided with two first and two second guide surfaces for guiding with at least two opposite edges of said corner fitting during connection and release respectively. This helps the coupling to take lashing loads on two contact points of the hole, further inclination of the coupling is avoided since the coupling will have at least two contact points with the hole of the corner fitting.

In a preferred embodiment the coupling device is also provided with a second connection means for connection to an adjacent corner fitting of a second container. The second connection means can be designed according to known or new technology, the purpose is to hold the coupling and housing in the corner fitting of the first container and also to take load during lashing and transportation of a container. Preferably said housing fits tightly in a hole of said corner fitting.

Advantageously said engaging part, comprising said guide part, said shaft and said second connection means, is formed in one piece. This is advantageously from a manufacturing point of view. Further a small number of parts and few movable parts will facilitate service.

According to the invention, a method is provided for releasing a first container from a second container connected by a coupling device, which coupling device comprises a housing, an engaging part which is at least partially insertable into and releasable from a corner fitting of said second container. Said method comprising the steps of:

lifting the first container in a vertical direction, during an initial step of releasing the container, moving the housing of the coupling device in a horizontal and vertical direction from the corner fitting during rotation of said engaging part, releasing said coupling device from the corner fitting of the second container by further rotation of the engaging part during moving of the housing of the coupling device in a horizontal and vertical direction, wherein said engaging part will pass through the hole of the corner fitting to a released position.

A method for connecting a first container with a second container connected by a coupling device according to the invention comprises the following steps:

lowering the first container provided with said coupling towards the second container, rotating the engaging part by interaction with the corner fitting of the second container, connecting said coupling device to the corner fitting of the second container by moving the first container further in a vertical direction, wherein said engaging part will pass through the hole of the corner fitting to an engaged position, rotating the engaging part back to a neutral position by means of a spring connected between the housing and said engaging part, Preferably the step of moving the housing according to the invention, during release of a coupling, further comprises that said horizontal and vertical movement is forced by a translation and rotation guide path of said engaging part, due to interaction between the engaging part and the hole of the corner fitting.

Moreover the step of moving the housing further comprises that a pitch of said rotational guide path is driving the engaging part to rotate during operation of said coupling device.

Advantageously the method further comprises the step of releasing the first container by simultaneously lifting an rotating the container around a central vertical axis of the container. This characteristic will be achieved if the couplings are mounted with the same orientation in all four corners of the container in relation to each corner fitting.

The coupling can be designed to achieve a forced rotation of the engaging part during release in the interval of 70°-1200, preferably 80°-110° and most preferably 90°. Corresponding design of the rotation angles of the engaging part during loading is advantageously 90°-120°, preferably 100°-115°, most preferably 110°.

The coupling according to the invention has the advantages of making it possible to load a container straight down onto another container with automatic connection. Further there is small demand on exactness during loading and it is possible to connect one corner of the container at a time during loading, which has not been possible with prior art couplings.

BRIEF DESCRIPTION OF THE DRAWINGS

Preferred embodiments will in the following be described in more detail with reference to the accompanying exemplary drawings, in which

FIG. 4a-c shows a sequence with a tilting, but safely secured upper container.

FIG. 5a-d shows a sequence during unloading of a first upper container from a second container.

FIG. 6a-d shows a sequence during loading of a first upper container on top of a second container.

DETAILED DESCRIPTION OF PREFERRED EMBODIMENTS

Figure 1:
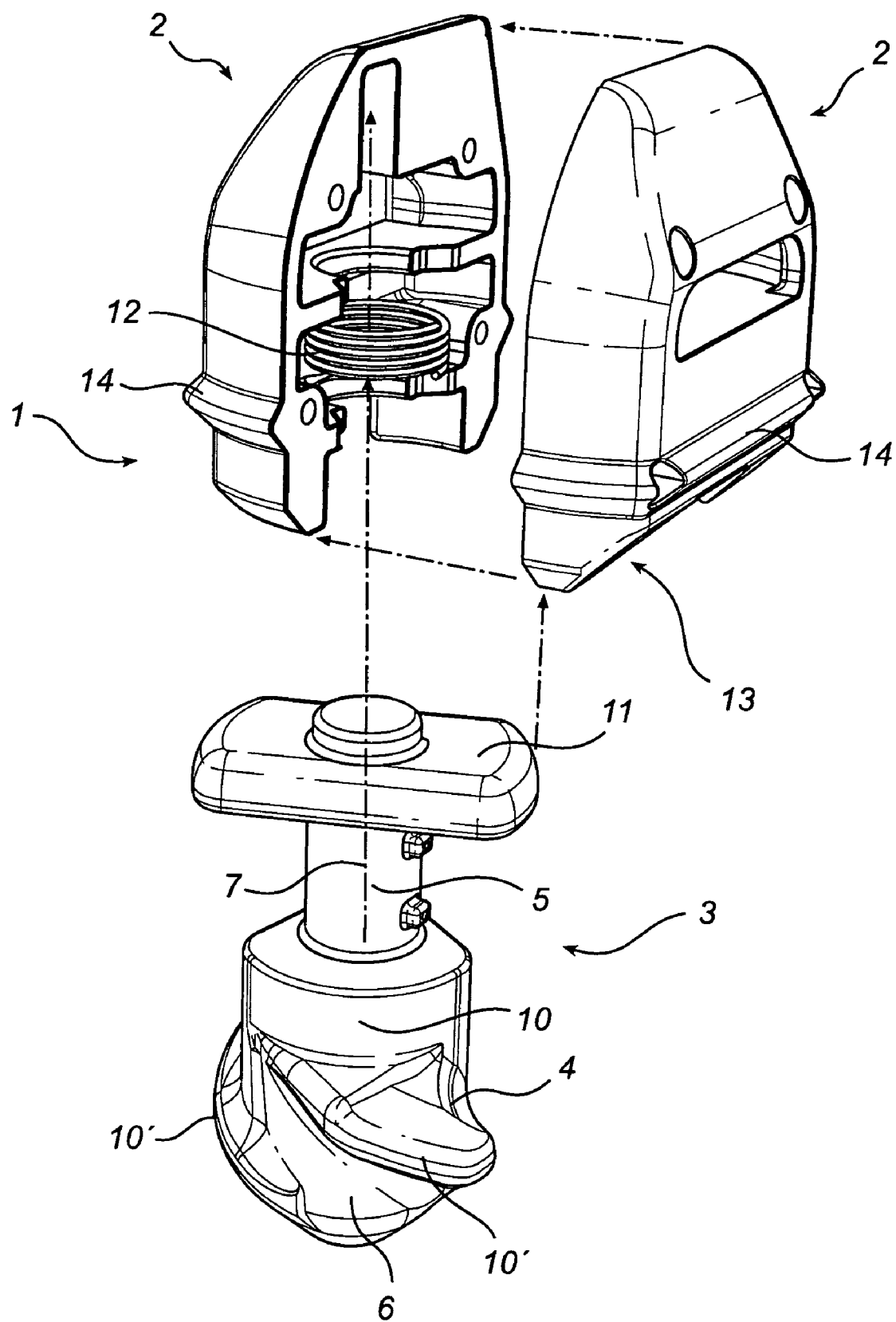
FIG. 1 shows an exploded view of a coupling device according to the invention in perspective.

The invention will now for the purpose of exemplification be described in more detail by means of examples and with reference to the accompanying drawings. An embodiment of a coupling device 1 according to the invention to be connected to existing corner fittings of an ISO container, said coupling device 1 being shown in FIG. 1, usually comprises a housing 2, an engaging part 3 which is at least partially insertable into and releasable from the corner fitting. The engaging part 3 has a guide part 4 for guiding the engaging part into and out from an oblong hole of a corner fitting.

Figure 2:
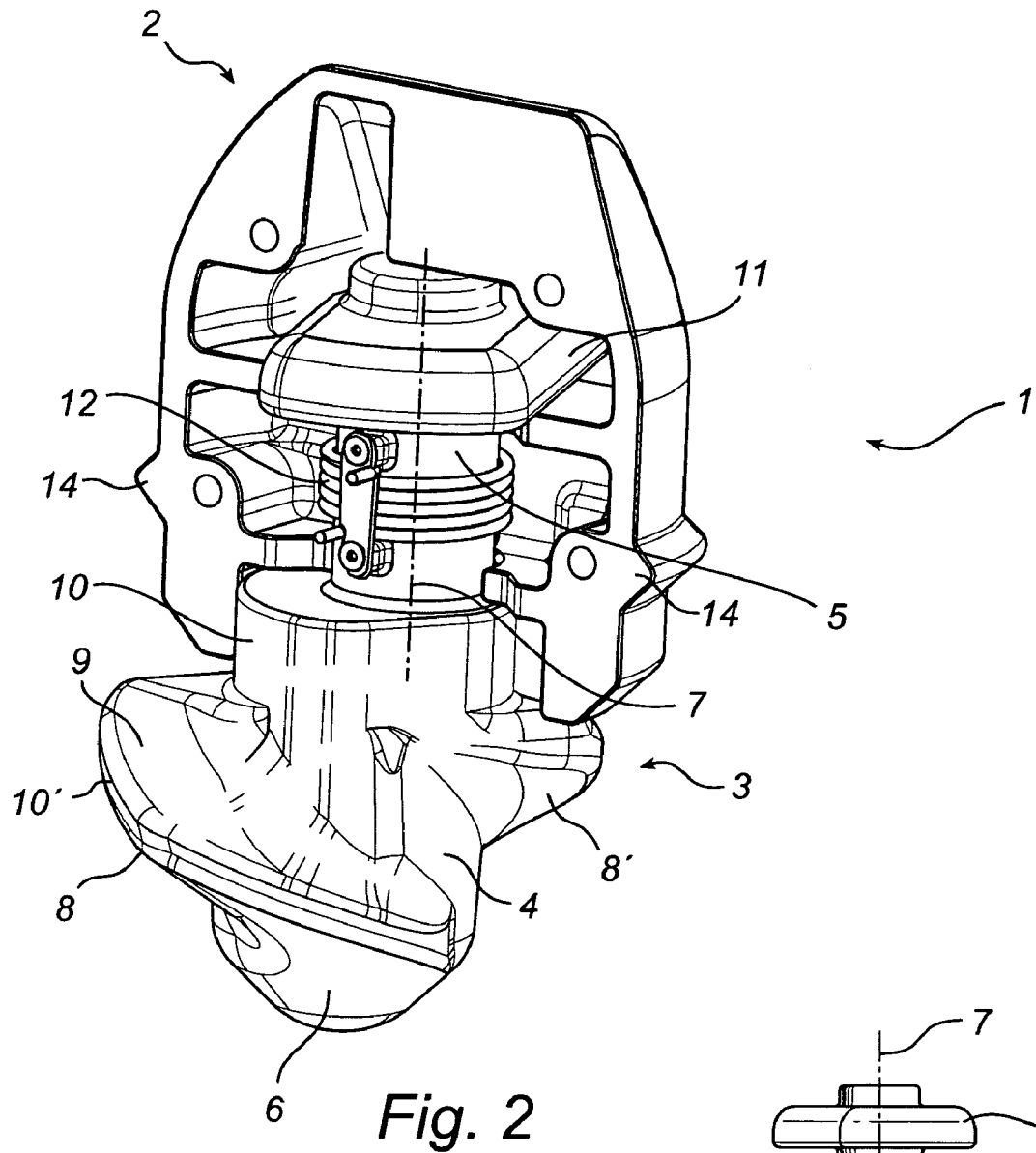
FIG. 2 shows the coupling device in perspective view with the housing in cross section.

The coupling device depicted in FIG. 2 shows the housing 2 and engaging part 3 which is rotably mounted in the housing by the shaft portion 5 extending into the housing 2. The engaging part 3 has a guide part 4 for guiding the engaging part with said corner fitting, the guide part 4 has a shape with a core 6 eccentrically located in relation to the axis 7 of the shaft 5. Further is two screw-shaped flanges radially protruding from the core 6, with a first upper guide surface 8, 8' and a second lower guide surface 9, 9'. The flanges are peripherally sloping and narrowing in radial direction downwards. The angle of the sloping rotational guide surfaces need to be large enough to avoid self-locking with the edge of the hole during rotation of the engaging part 3.

Directly above the guide part 4 is formed a cam portion 10, the eccentric part of the cam 10 has essentially the same extending direction as the eccentricity of the guide part 4, in relation to the axis 7 of the shaft 5. By manufacturing reasons the engaging part 3 is made from one piece of material.

In the present embodiment a combination of the surfaces of the cam 10 and the surfaces of the screw 10' is used as translation guide path for guiding the engaging part 3 in relation to said corner fitting in a horizontal direction.

In this example embodiment, the housing 2 comprises two halves. The two halves are assembled around the shaft 5 of the engaging part 3. The design of the housing 2 permits the engaging part 3 to rotate around the axis 7 of the shaft 5. Further, the second connection means 11 extends out from the housing 2 for connection with the corner fitting of the first upper container. The second connection means 11 can be retracted into the housing 2 by rotation of the engaging part 3, to make it possible to connect the coupling 1 to the first container.

There is a chamfer 13 provided at the lower part of the housing 2 to permit the coupling and housing to move upwards and sideway, during unloading, the chamfer 13 will prevent a collision of the housing 2 with the edge of the hole in the corner fitting. Further the housing is provided with a recess or swelling 14 extending horizontally around the housing for positioning of the housing 2 in relation to the holes of the corner fittings of the containers.

The screw-shaped flange of the guide part 4 can be described as a double acting twist cone, which is asymmetric oriented in relation to the rotation axis 7 of the engaging part 3. The double acting twist cone drives the engaging part to rotate both during engaging and release of the coupling 1 with the corner fitting, wherein the vertical movement of the coupling 1 partly is transformed to a forced rotation of the engaging part 3. The eccentric position of the double acting twist cone in combination with the cam 10 cooperates during unloading of a container to force the container to move in a sideway direction. On the other hand the cam 10 and the eccentric twist cone acts in a different way during loading since the rotation is in the opposite direction.

The coupling 1 according to the invention is described as for connection of two containers to each other, but the invention can also be used in other applications. For example for connecting a container to a transport vehicle, the floor of a ship or other connections or applications where it is desired with an automatic coupling.

Figure 4A:
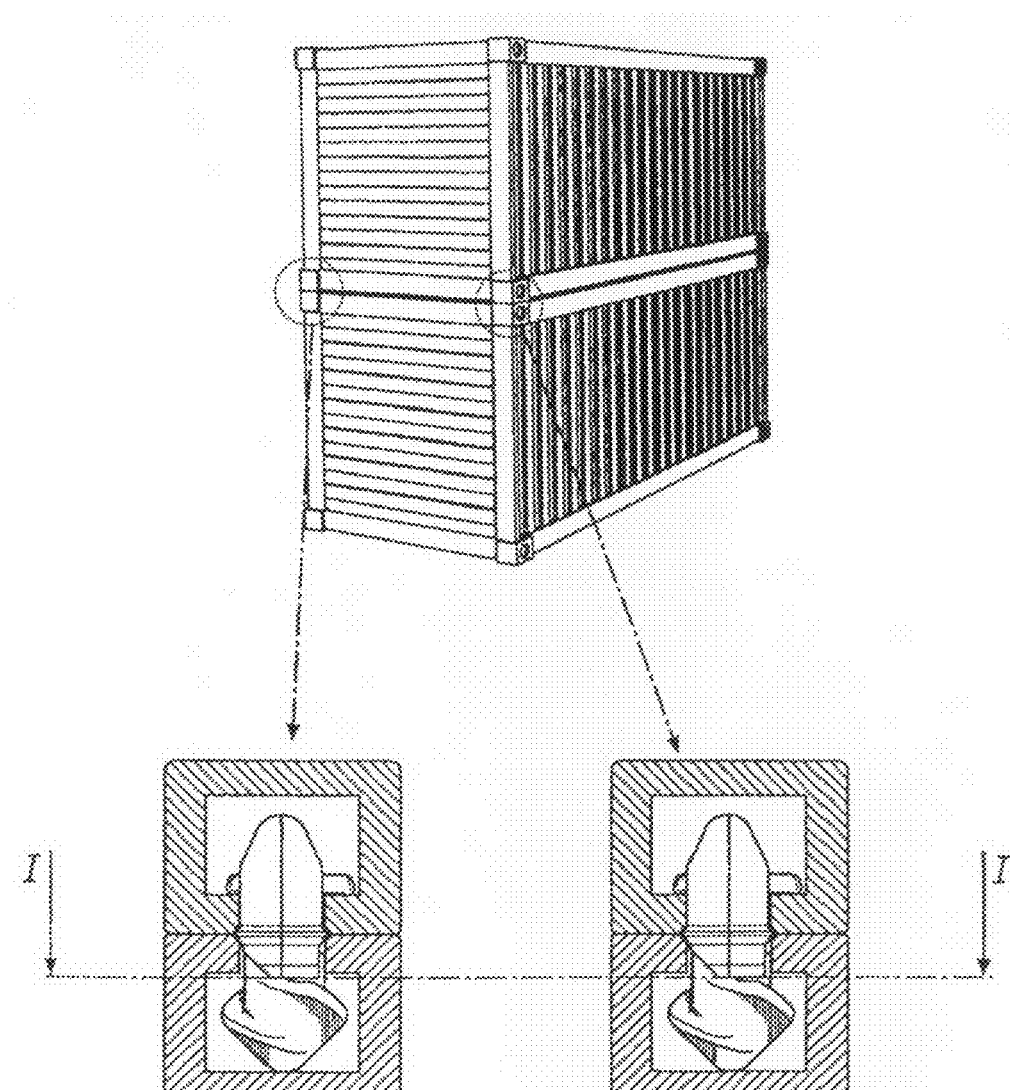
Figure 4A:
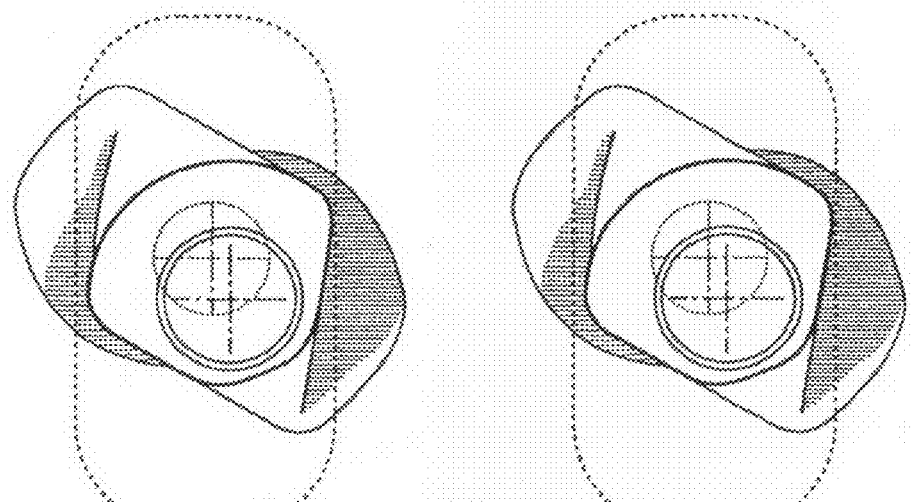

FIG. 4a shows a first upper container safely stacked and coupled to a second lower container, by means of four coupling devices 1.

Figure 4B:
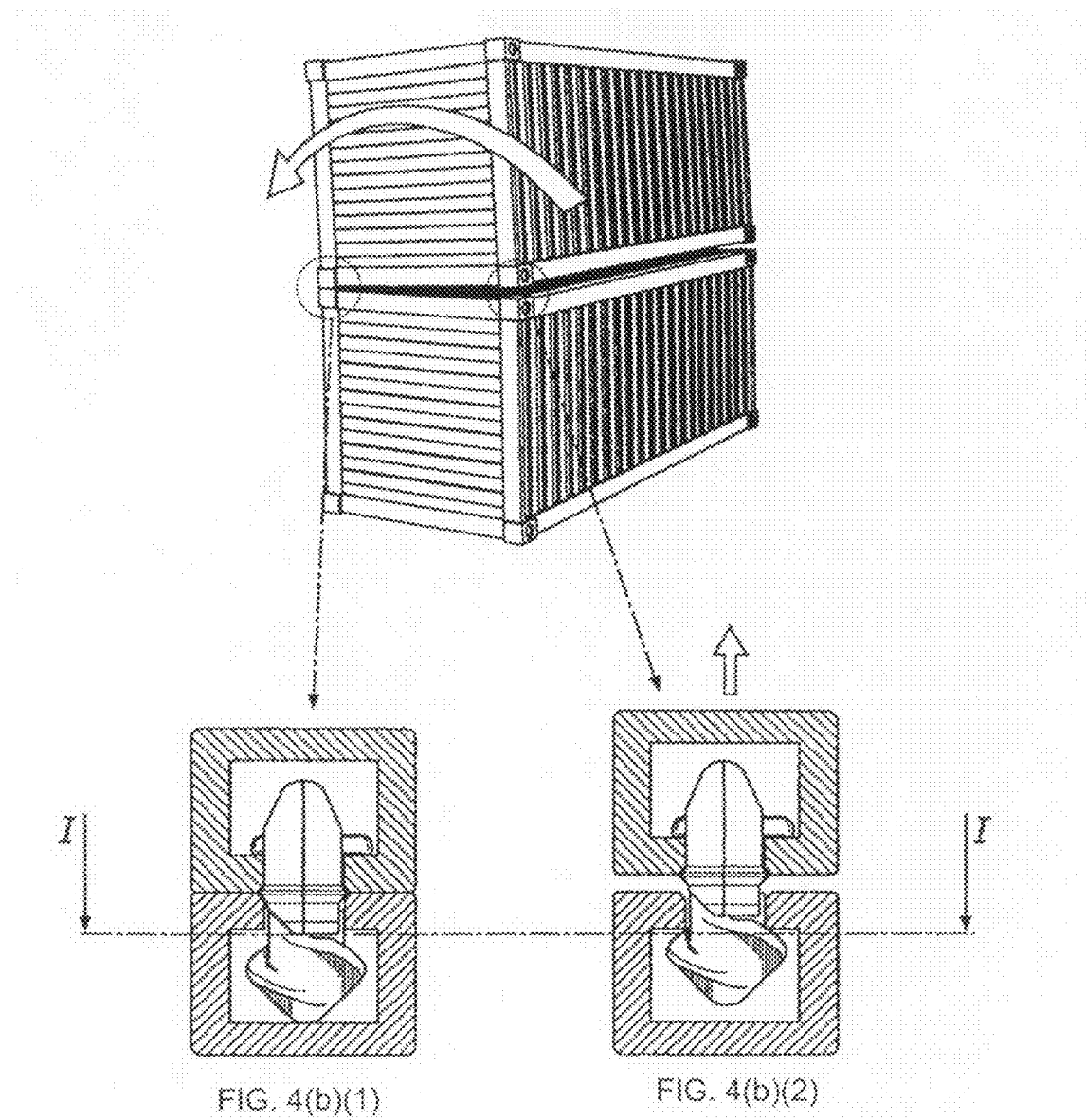
Figure 4B:
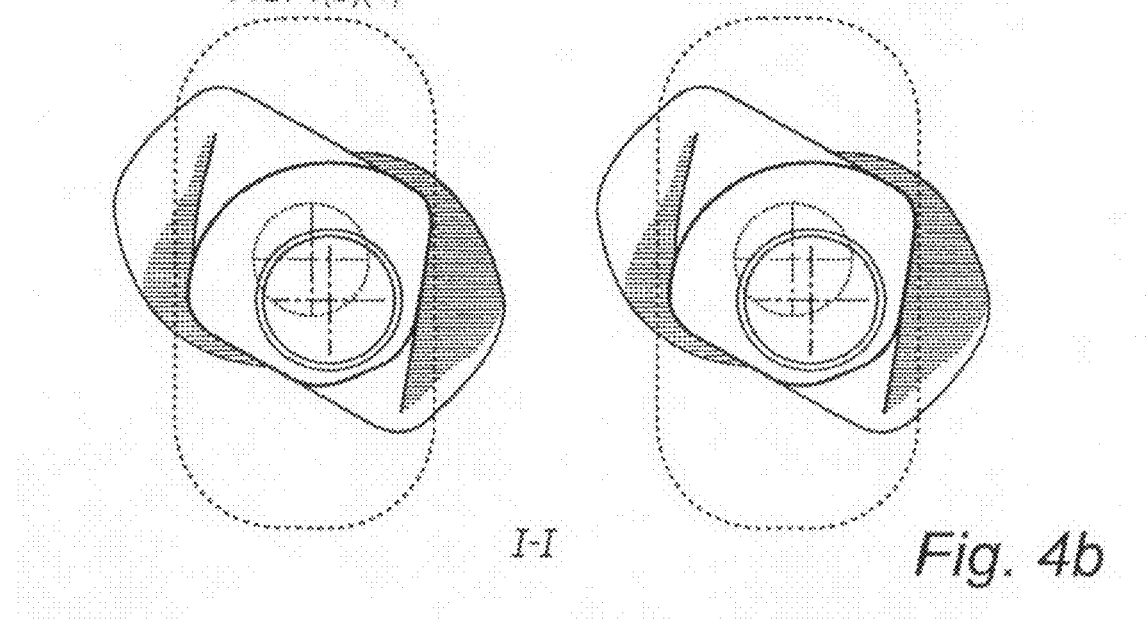

FIG. 4b shows an initial stage of a tilting container, for example due to a great tilting of a loaded ship.

FIG. 4c shows a sequence during tilting, when couplings on one long side of the container are pulled apart and their engaging parts starts to rotate. But the couplings on the opposite sides are compressed and prevent the first upper container from moving in a horizontal direction, wherein the containers remain safely connected.

It is desired that the containers remain connected when a stack of containers are tilted, FIG. 4a-c, for example if a ship is rolling due to wind and waves at sea. In this case each container is tilted, usually sideways in relation to the length direction of the container and the ship, and hence the two couplings on one long side are compressed and the opposite two couplings are pulled apart as shown in FIG. 4c. The two couplings that are pulled apart moves initially in the same way as during unloading, but since the two compressed couplings prevent the container to move in a horizontal direction, due to that the housing fits in both the corner fitting of the first and second container, the engaging parts 3 of the couplings that are pulled apart can not perform their horizontal movement forced by the shape of the guide part 4 and hence the containers will remain safely connected.

For the couplings that are pulled apart, the rotational path of the guide part 4 starts to rotate the engaging part counter-clockwise, seen from below, and the translation guide path of the cam 10 comes in contact with one long side edge of the hole. Further, the pitch of the rotational guide path wants to drive the engaging part 3 and the housing 2 upwards at the same time as the cam 10 and the eccentricity of the guide part wants to drive the housing 2 in a horizontal direction. But since this movement can not be performed due to the compressed pair of couplings blocking the horizontal movement, the two couplings that are pulled can not continue the release from the hole of the corner fitting.

Figure 5A:
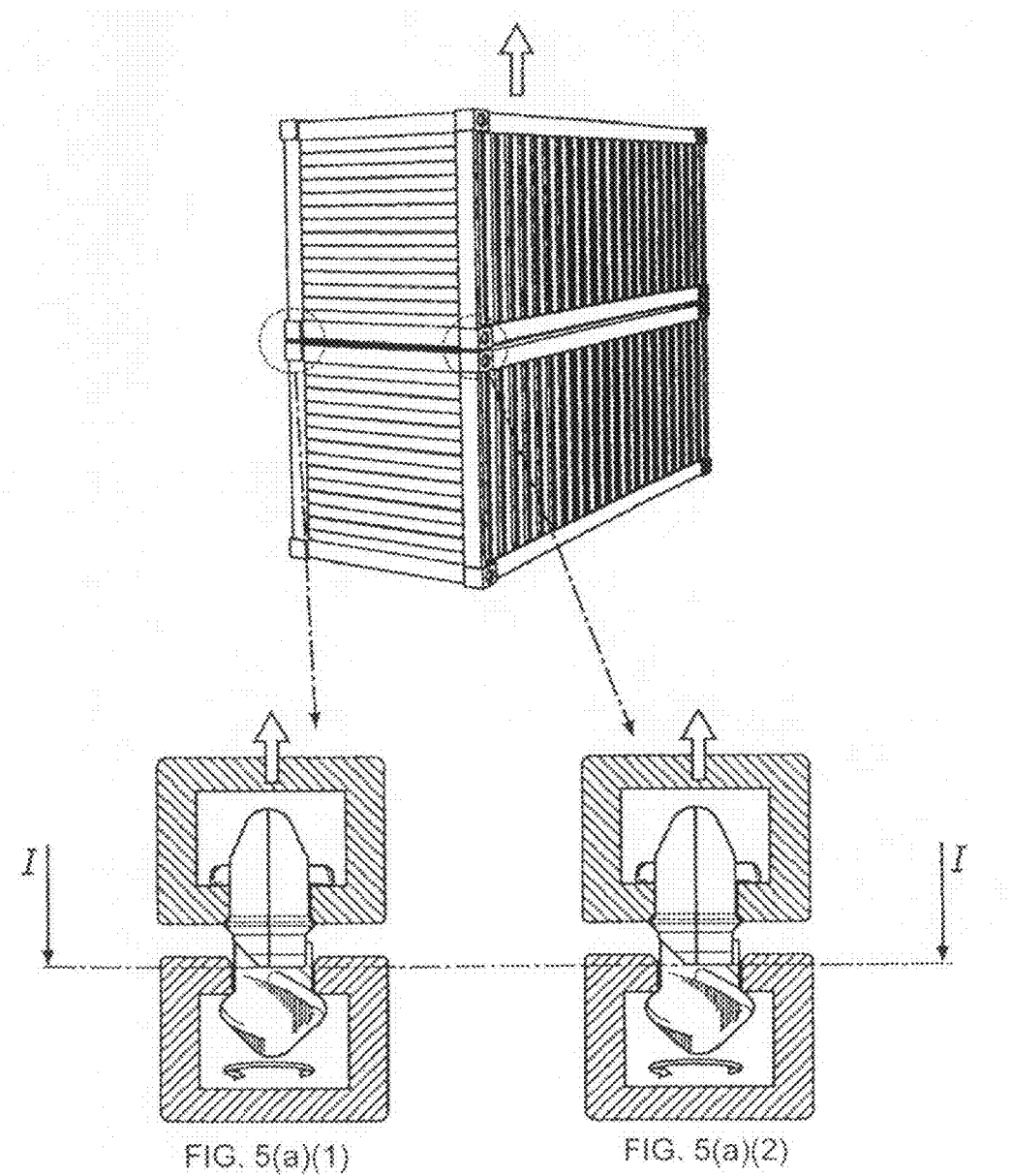
Figure 5A:
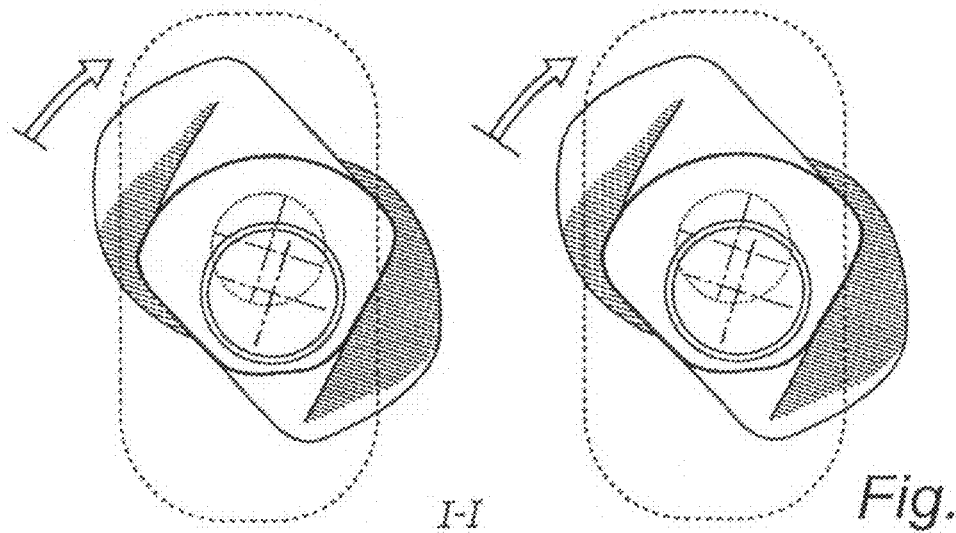

FIG. 5a shows an initial step during unloading of the first upper container, which is coupled to a second container.

FIG. 5b shows a preceding stage where the first lifted container is geometrically guided by the shape and the characteristics of the engaging part 3 of the coupling 1 forcing the lifted container to rotate during lifting.

In FIG. 5c is shown a further step during release of the lifted container. The engaging part 3 has been rotated (approximately 90°) to a position where engaging part can pass through the hole of the corner fitting.

Figure 5D:
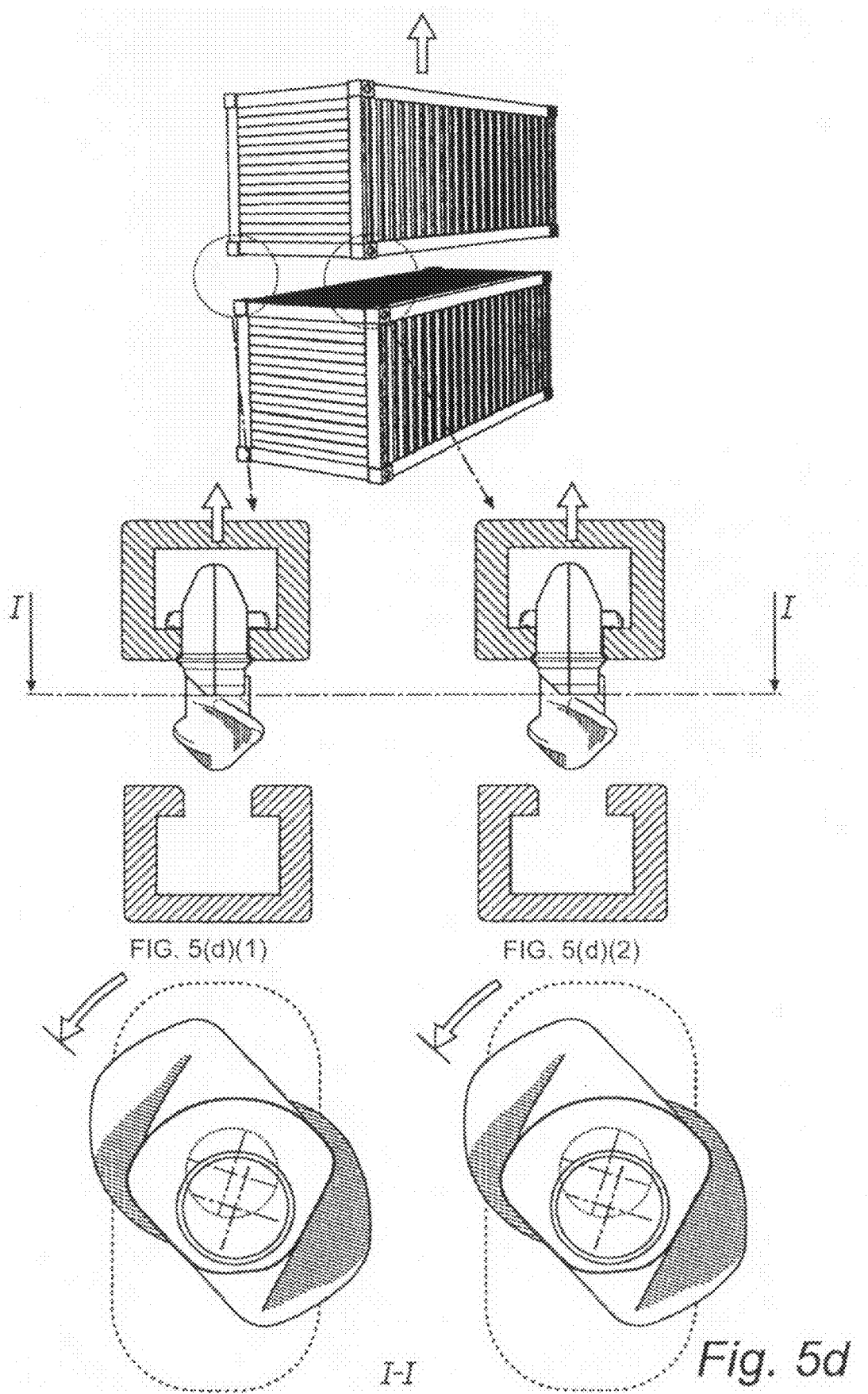

FIG. 5d shows the first container in a released condition where the engaging part 3 has been rotated back to the neutral position by the spring 12.

During unloading, FIG. 5*a-d*, of a first container connected to a second container a lifting device is used for lifting the first container from the second container. During lifting of the first container and the four coupling devices 1 the pitch of the second guide surface 9 of the guiding part 4 will cause the engaging part 3 to rotate in a counter clockwise direction, seen from below. When the engaging part 3 rotates the translation path of the cam will interact with the long side of the hole and push the housing 2 sideways, FIG. 5*b-c*. The core of the guide part 4 is located approximately on a line 45° in relation to a line through the axis 7, which line is parallel with the oblong direction of the hole and the core is also eccentrically located at a distance 18 mm from the rotation axis 7 of the shaft 5. Due to the 45° eccentrically located core of the guide part 4 described above, shown in FIG. 3, the housing 2 and the first container will be forced to move with a horizontal component in a direction parallel to the short side of the container during unloading.

The coupling devices 1 will follow the lifted container since they are coupled in the corner fittings of the first container by use of a second connection means 11. All four couplings will move upwards and sideways at the same time, and they will await each other if necessary.

During the initial rotation of the engaging part 3 the engaging part will force the housing 2 and the first container to move upwards and in a horizontal direction, FIG. 5*b*, this is both due to the eccentrically position of the guide part 4 and the translation path of the cam 10. Both the cam 10 and the eccentrically position will interact with the edges of the oval hole of the corner fitting and the engaging part 3 will rotate approximately 90° and guide the guide part 4 to a released position of the coupling 1 from the second container. All four engaging parts of the couplings will rotate and release more or less simultaneously during unloading of the first container. There is no need of manual operation of the couplings 1 before the first container is lifted away, since the release is fully automatic.

During release of a coupling 1 the pitch of the guide surface 9 of the guide part 4 converts the vertical lifting movement to a driving rotation of the engaging part 3, and this driving rotation is used by the geometry of the guiding part 4, i.e. eccentrically positioned screw flanges and asymmetric cam geometry, to force the housing 2 in a direction with a horizontal component.

When the first container is released and the engaging part 3 of the coupling 1 is out of engagement from the hole of the corner fitting the spring 12 connected between the housing 2 and the engaging part 3 will rotate the engaging part back to the neutral position, FIG. 5*d*.

The neutral rotation position is achieved by a spring 12 acting on both sides of a recess at the shaft 5 and a recess in the housing 2, this makes the engaging part 3 return to the neutral position from a rotated position both clockwise and counter-clockwise from the neutral position.

The four couplings of a container can be mounted either with the same orientation in all four corner fittings or else with the same orientation in relation to each corner fitting. The first orientation makes the first container unloaded by a lifting movement, from the lifting device, sideways in relation to the length direction of the container. The later orientation makes the unloading movement a rotation of the container around a vertical center axis, at the same time as the container is lifted, FIG. 5*b-c*.

FIG. 6*a* shows the first container, above a second container, in position to be coupled to each other.

In FIG. 6*b* the first container is lowered straight down towards the second container, the engaging parts 3 of the couplings will rotate due to the contact between the guiding surfaces 8,8' and the edges of the hole in the corner fitting.

Figure 6C:
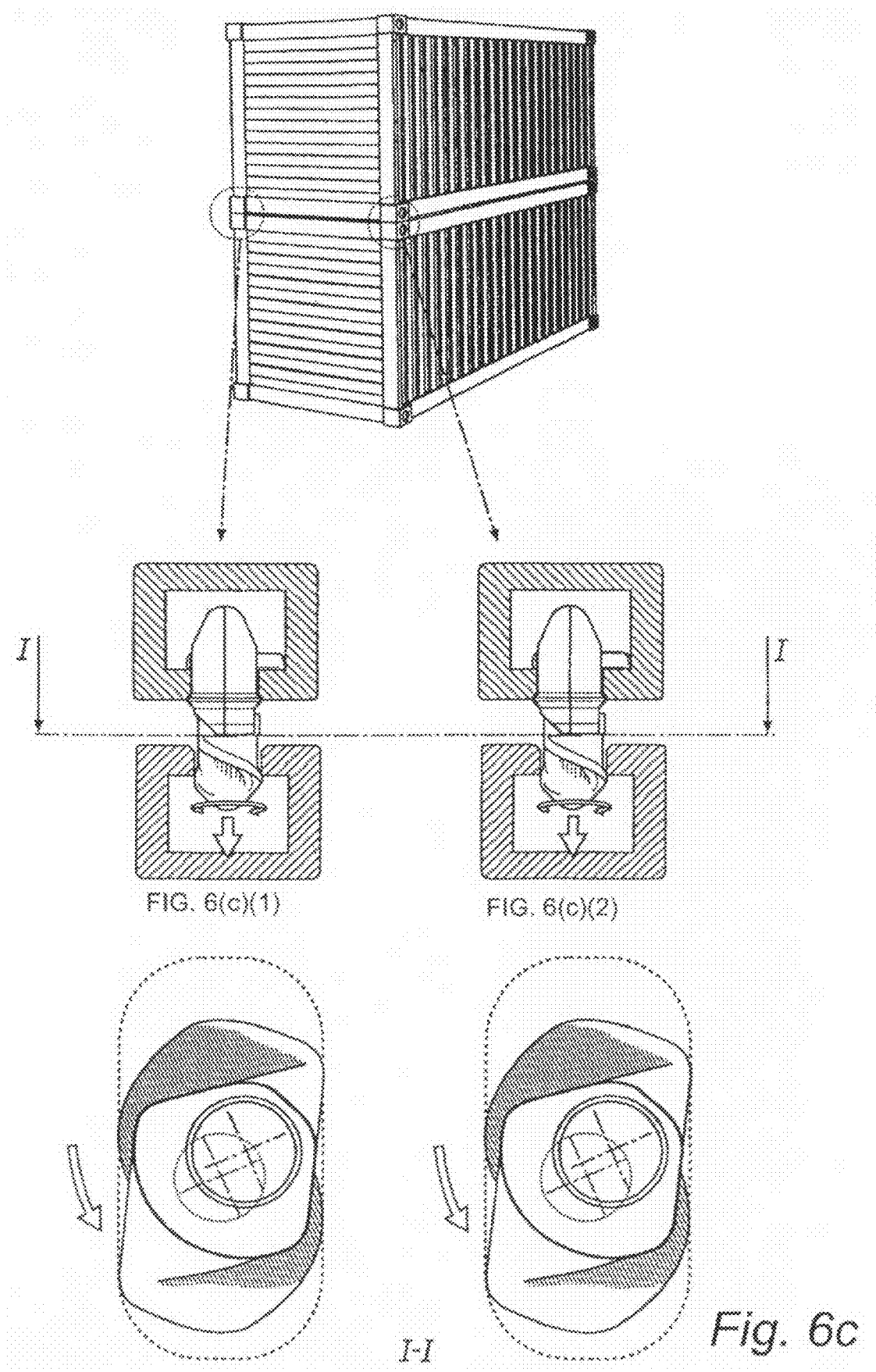

FIG. 6*c* shows how the engaging part 3 passes down into the oval hole of the corner fitting. The engaging part 3 moves during rotation with a circular arc, essentially in the longitudinal direction of the oval hole. When the coupling is engaged with the second container, FIG. 6*d*, the spring 12 forces the engaging part 3 to rotate back, counterclockwise seen from below, to the neutral position.

During loading, FIG. 6*a-d*, usually stacking of one container on top of another container, coupling devices according to the invention are mounted, by using the second connection means 11, in the holes of the four corner fitting under the container to be loaded. A crane or other lifting device lifts the first container above the second container and the first container is lowered straight down on to the second container. During lowering of the first container the engaging part 3 of the coupling device 1 will rotate clockwise, seen from below, due to the contact between the edges of the hole and the rotation guide path of the engaging part 3. The guide part 4 will perform a rotation from the neutral position with a resulting movement generally in the longitudinal direction of the oblong hole of the corner fitting. This is since the core 6 of the guide part 4 is eccentrically located at a distance 18 mm from the rotation axis 7 of the shaft 5, FIG. 3, and the core is located approximately on a line 45° in relation to a line through the axis 7, which line is parallel with the oblong direction of the hole. Since the guide part 4 moves generally in the oblong direction of the hole the first container can be lowered vertically straight down onto the second container during engagement between the engaging part 3 and the hole of the upper corner fitting of the second container.

During the initial stage of the engagement of the engaging part 3 with the corner fitting the first container is guided in position over the second container by introduction of the conical part of the guide part 4 in the hole of the corner fitting of the second container, FIG. 6*b*. In next step of the coupling sequence the parallel edges of the hole of the corner fitting will serve as guide for the first guide surface 8 of the rotational guide path, FIG. 6*c*. When the first container is lowered from this position the engaging part 3 will start to rotate due to the pitch of the first guide surface, which will be guided in the hole. The screw-shaped first guide surface forces the engaging part 3 to rotate approximately 110° from the neutral position. During this rotation the cam 10 is inactive since the radially extending asymmetric part of the cam 10 is directed in the oblong direction of the hole during the engagement rotation of the engaging part 3.

Figure 3:
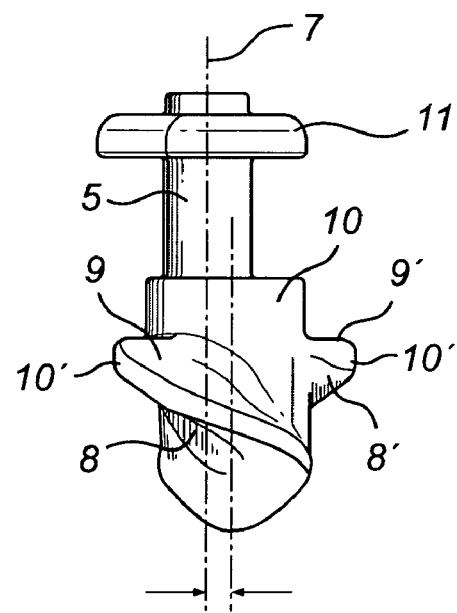
FIG. 3 shows in side view the engaging part of the coupling device.
Figure 6D:
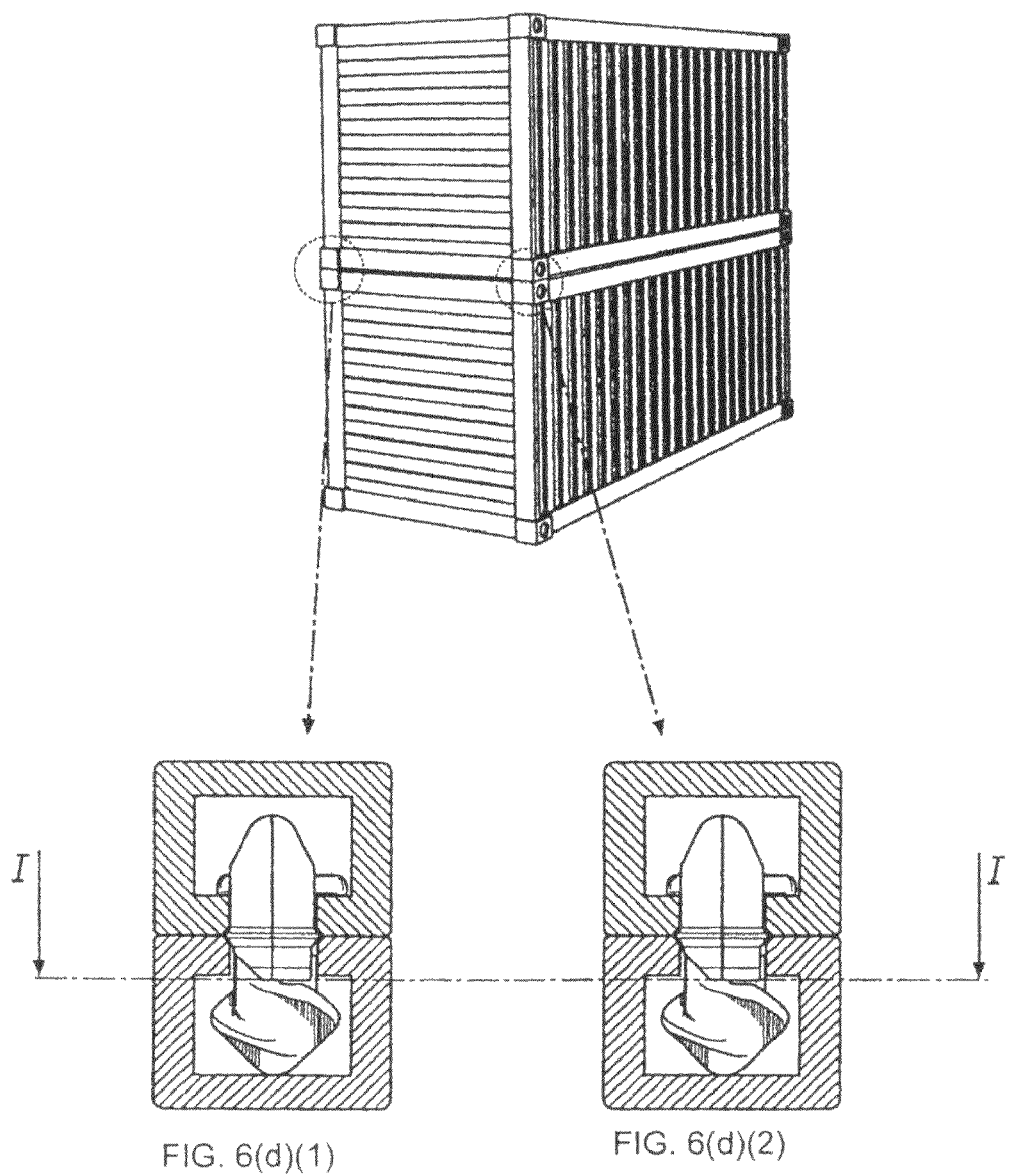
Figure 6D:
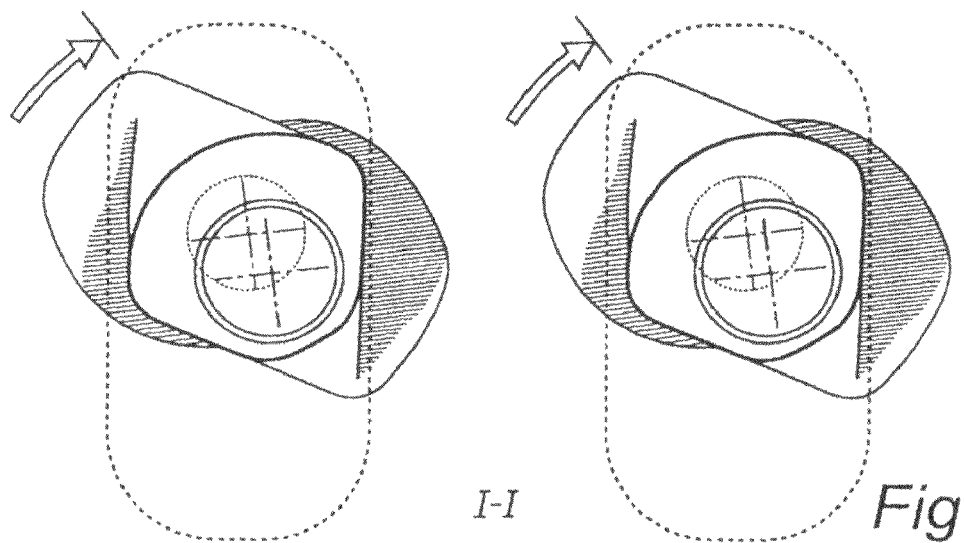

During the final stage of coupling of two containers when the guide part 4 of the engaging part 3 has entered the corner fitting completely the spring 12 provided between the housing 2 and the engaging part 3 will rotate the engaging part back (approximately 110°) to the neutral position and hence lock the first and second container together, FIG. 6*d*, this is since the guide part is eccentrically positioned, FIG. 3, but also since the guide part 4 has an oblong shape, in a horizontal cross section, that can not pass direct through the oval hole of the corner fitting.

Consequently the loading and connection of two containers to each other can be performed fully automatic with a coupling 1 according to the invention, and there is no need for manually operation of the coupling other than connecting the coupling to the first container.

It is possible to engage one of the four coupling devices individually during connection of two containers i.e. it is not necessary to engage the coupling devices in all four corners of the second container at the same time. This could for example be the case if the ship is tilting during loading, e.g. due to asymmetric loading of the ship, the crane operator does not need to lower all four corners of a first container simultaneously for connection. The couplings will provide engagement of two containers automatically without any manually operation.

The invention claimed is:

1. A coupling device for connecting corner fittings of adjacent containers, said coupling device comprising:
   a housing for fitting tightly within the corner fitting of one container,
   an engaging part which is at least partially insertable into and releasable from the corner fitting of an adjacent container, said engaging part having a central axis, a guide part and a cam, and
   a shaft portion extending from the engaging part and into said housing such that the shaft and housing are rotatably engaged,
   wherein said cam is a translational guide body adjacent to, and eccentrically positioned with respect to an axis of, said shaft portion for facilitating translational movement of the engaging part in relation to said corner fittings,
   said guide part includes a rotational guide element for facilitating a driving rotational movement of the engaging part in relation to the corner fitting;
   the eccentrically positioned cam and guide part cooperatively transform a substantially vertical movement of the coupling member to a driving rotation of the engaging part and subsequent translational movement of the housing to move the housing in a horizontal direction for release of said engaging part from the adjacent corner fitting.

2. A coupling device according to claim 1, wherein said rotational guide element having a pitch for driving the engaging part in relation to said corner fitting in a vertical axial direction, parallel with the axis of said shaft, during rotation.

3. A coupling device according to claim 1, wherein said rotational guide element has a first guide surface, for rotation of the engaging part during connection with said corner fitting, and a second guide surface for rotation of the engaging part during release from said corner fitting.

4. A coupling device according to claim 1, wherein said guide part is in a shape of a screw.

5. A coupling device according to claim 4, wherein said screw includes a thread, said thread is provided with lower and upper flanks constituting first and second guide surfaces.

6. A coupling device according to claim 1, wherein the engaging part is rotatable against spring action from a neutral position in one direction during connection with said corner fitting and rotatable against spring action in the opposite direction from the neutral position during release from said corner fitting.

7. A coupling device according to claim 1, wherein said cam is fixedly positioned on the engaging part between said shaft and said guide part.

8. A coupling device according to claim 1, wherein the guide part has a conical outer shape.

9. A coupling device according to claim 1, wherein said rotational guide element is provided with two first guide surfaces and two second guide surfaces for guiding with at least two opposite edges of said corner fitting of said adjacent container during connection and release, respectively.

* * * * *